(12) United States Patent
DeBaer

(10) Patent No.: US 6,997,543 B2
(45) Date of Patent: Feb. 14, 2006

(54) TOTAL INK CONTROL METHOD FOR COLOR RENDERING IN PRINTING SYSTEM

(75) Inventor: Dirk C. DeBaer, Berchem (BE)

(73) Assignee: Monotype Imaging, Inc., Woburn, MA (US)

(*) Notice: Subject to any disclaimer, the term of this patent is extended or adjusted under 35 U.S.C. 154(b) by 278 days.

(21) Appl. No.: 10/687,367

(22) Filed: Oct. 16, 2003

(65) Prior Publication Data

US 2005/0083371 A1   Apr. 21, 2005

(51) Int. Cl.
*B41J 2/21* (2006.01)
*B41J 2/205* (2006.01)

(52) U.S. Cl. .......................... 347/43; 347/15
(58) Field of Classification Search .......... 347/15, 347/43; 358/1.1–1.9, 3.01–3.09, 3.1–3.3, 358/429, 534

See application file for complete search history.

(56) References Cited

U.S. PATENT DOCUMENTS

| | | | |
|---|---|---|---|
| 5,975,671 A | | 11/1999 | Spaulding et al. |
| 6,016,359 A | * | 1/2000 | Komatsu .................. 382/162 |
| 6,057,932 A | | 5/2000 | Yoshida et al. |
| 6,084,689 A | | 7/2000 | Mo |
| 6,561,610 B1 | * | 5/2003 | Yamasaki et al. ............ 347/15 |
| 6,796,629 B1 | * | 9/2004 | Komatsu et al. ............ 347/15 |
| 2003/0169438 A1 | | 9/2003 | Velde et al. |

* cited by examiner

*Primary Examiner*—Thinh Nguyen
(74) *Attorney, Agent, or Firm*—Breiner & Breiner, L.L.C.

(57) ABSTRACT

A total-ink method ensures that the total amount of available colors remains the same such that the color characterization process can treat the restricted printing process as if it is dealing with a non-restricted printing process without loss of quality. This method enhances non-lossless, black generation methods traditionally used for total-ink restriction by generating compensated target device contone image data in which colorant applied to the media is limited based on a total ink constraint by providing a one-to-one mapping between each possible input contone image data value and each possible compensated target device contone image data value, using a bijective function, for example.

22 Claims, 3 Drawing Sheets

TOTAL INK CONTROL METHOD FOR COLOR RENDERING IN PRINTING SYSTEM

BACKGROUND OF THE INVENTION

Images are typically recorded and stored as contone images in which each image element has a color tone value. For example, consider a digitally stored color image—each image element will typically have three corresponding values setting tone, among 256 gradations, for example, for each of the primary colors.

Many printing processes, however, cannot render an arbitrary color tone value at each addressable location or pixel. Flexographic, xerographic, inkjet, and offset printing processes are basically binary procedures in which color or no color is printed at each pixel. For example, at each addressable point on a piece of paper, a laser printer can generally either lay down a dot of black or colored toner or leave the spot blank, i.e., white. However, some newer devices have a limited ability to deposit intermediate quantities of colorant, such as toner or ink, or have multidensity colorants.

Digital halftoning involves conversion of the contone image to a binary, or halftone representation. Color tone values of the contone image elements become binary dot patterns that, when averaged, appear to the observer as the desired color tone value. The greater the coverage provided by the dot pattern, the darker the color tone value.

Further, in most print systems, it is necessary to also convert the input contone image, in some color space, to a colorant space of the target device. Many times images are stored such that the pixel level data are in terms of levels of red, green, and blue (RGB). This is most convenient when rendering on common display devices. In contrast, standard printing systems are usually based on a four color pallet of cyan, magenta, yellow, and black (CMYK). The conversion is typically performed using a look-up table (LUT) that maps pixel data comprising red, green and blue levels to pixel data comprising cyan, magenta, yellow, and black levels. These look-up tables are defined by first printing combinations of cyan, magenta, yellow, and black colorants, measuring the resulting colors, and inverting the resulting color table.

To increase image smoothness and color accuracy, it is increasingly common in ink jet printing, for example, to supply more than the standard four colorants (CMYK). In particular, it is common to provide light versions of the cyan and magenta colorants. There light versions can be made with dilute solutions of the colorants. The darker colorants are needed to make fully saturated colors without overloading the paper. However, these heavy inks can make very visible dots on the page, which are especially noticeable in the lighter tones. Therefore, if the lighter inks can be used in the lighter tonal range, the halftone pattern will be less visible. In other examples, additional colorants such as orange and green are added to the device's pallet to improve color rendition.

Increasing the number of colorants results in a more complex conversion to the target device color space. The most straightforward generalization would be to use a 3-to-6 color conversion LUT. However, creating such a table becomes very difficult since it must be created by choosing an inverse from a 6-to-3 table of measurements. This table is very large, and there are many degrees of freedom.

One limitation that constrains the available degrees of freedom in practice concerns the fact that certain ink/media properties or hardware restrictions may require a printing process to limit the allowable maximum total amount of combined colorant, called the total-ink, to a value less than the sum of the maxima of each colorant. Therefore, some mechanism is required to modify the rendering process to enforce these constraints.

A practical example of the application of a total ink reduction is ink-jet printing where on some substrates and when using certain inks, the ink will not stick to the media anymore and cause bleeding of ink when too much ink is used. Another example is in the context of laser jet printing. Although a laser jet can print the maximum amount of ink without visual problems on the print-out, the age of the drum is drastically reduced and may even cause damage when using too much ink for an extended period over large areas. So many laser jet engine manufacturers require the total ink to stay below a certain tolerance level (typically 270%).

Techniques exist for addressing this problem. Some of the most common techniques for controlling total ink (also called total area coverage) are UCR/GCR (under cover removal and grey component replacement). These techniques are applied in many graphic arts related products, such as postscript raster-image processors. They address the way the amount of black colorant is calculated. By calculating first the equivalent neutral density of the desired color, then reducing the amounts cyan, magenta, and yellow colorants appropriately and replacing this neutral component by an equivalent amount of black colorant, in principle the same color is obtained but with a lower total amount of colorant, since the black colorant replaces three colorants.

Other techniques operate by imposing hard limits on the total ink that is applied to a given area. In one such example, after the half-toning of the image data, the half-tone data are analyzed to determine whether the total ink density is higher than a predetermined limit value within a given pixel matrix area. When the limit is exceeded, the ink density is reduced by determining a reduction coefficient that is applied to the quantity of ink applied for each of the chromatic colors. This yields corrected color quantities that are actually applied to the paper.

SUMMARY OF THE INVENTION

It is preferable that in a color characterization of this printing process that the total-ink limit is handled upfront and is therefore already enforced when characterization test charts are printed. However if the total-ink restriction method reduces the total number of different colors one can make with the printing process, the overall quality of color rendering will decrease and the color characterization process often becomes unstable.

According to the invention, the total-ink method ensures that the total amount of available colors remains the same and that therefore the color characterization process can treat the restricted printing process as if it is dealing with a non-restricted printing process without loss of quality. This method enhances non-lossless, black replacement methods traditionally used for total-ink restriction.

In more detail, first a total-ink amount is given, selected or automatically determined. Secondly a non-empty subset of the available colorants is chosen as target colorants. Using these two parameters a preferably smooth and bijective function, "$\Psi$", is defined from the non-restricted colorant space to the restricted colorant space defined as the space of colorants where the sum of colorant amount is less than or equal to the specified total-ink amount. The bijective function will only modify the amounts of target colorants, leaving non-target colorants unaltered by the function $\Psi$. The preferred way of using the method is by embedding it in the printer driver. In this case the method would be part of the printer driver workflow.

One choice is to embed the function $\Psi$ in the printing workflow, by applying $\Psi$ to any incoming color before this color is actually rendered by the printing process. Another possibility is to make the function $\Psi$ part of the color management workflow where it used to restrict a color when converting to the device color space and the inverse of $\Psi$ is used to convert a device color of the printing process to another color space.

In general according to one aspect, the invention features a system for rendering an image on a target device from a contone image. The system comprises a color space converter that generates target device contone image data from input contone image data. In one example, the input contone image date is in a red, green, blue color space that is converted to a cyan, magenta, yellow, black color space of the printing device.

A halftoning stage is provided for converting the target device contone image data into target device halftone image data such that a print engine can apply colorant to media in response to the halftone image data.

According to the invention, a total ink compensating stage is further provided that modifies the target device contone image data received by the halftoning stage, for example, by limiting colorant applied to the media based on a total ink constraint. This avoids problems related to overloading the print media with ink or toner, for example. This colorant limitation, however, is achieved by providing a one-to-one mapping between each possible input contone image data value and each possible compensated target device contone image data value. In this way, the invention avoids the problem of two input contone image data values being printed on the media with the same compensated target device contone image data value, thereby defining a lossless process.

In one embodiment, the print engine is an ink jet printer, but the invention also applicable to laser printers.

In the current embodiment, the total ink compensating stage provides the one-to-one mapping between each possible input contone image data value and each possible compensated target device contone image data value using a bijective function to thereby enforce the one-to-one mapping.

In still other embodiments, the total ink constraint is applied to only a subset of colorants used by the print engine, and the total ink compensating stage is embedded in a print driver.

In general according to another aspect, the invention features a method for rendering an image at a target device from a contone image. The method comprises receiving input contone image data and converting the input contone image data to target device contone image data. According to the invention, compensated target device contone image data is generated in which colorants applied to the media are limited based on a total ink constraint by providing a one-to-one mapping between each possible input contone image data value and each possible compensated target device contone image data value.

The compensated target device contone image data is then converted into target device halftone image data and colorants applied to media in response to the halftone image data.

In general according to another aspect, the invention features a method for rendering an image at a target device from a contone image for color data in general, outside of a printer workflow. This method can be applied inside, for example, a color correction software module. Further, because of the loss-less nature of the inventive process, an inverse can also be applied for soft-proofing, for example.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
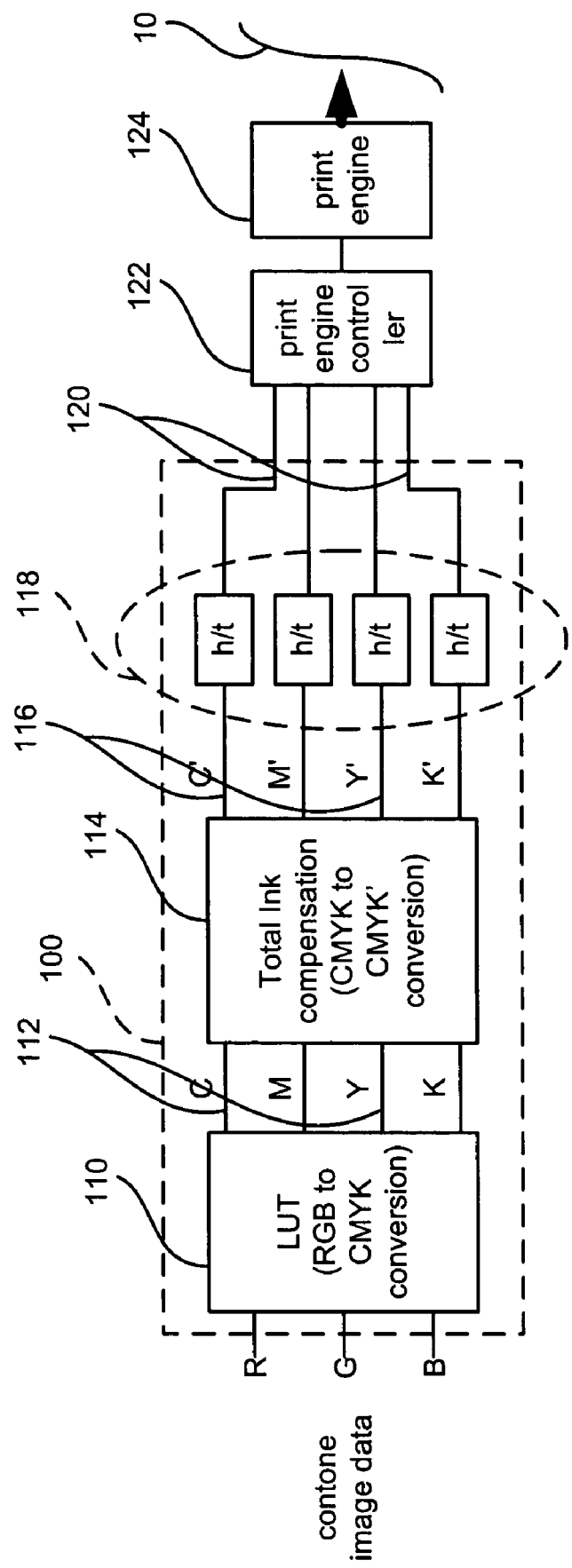
FIG. 1 is a block diagram showing a system for rendering an image on media from a contone image data, according to the present invention.

FIG. 1 shows a rendering system, which has been constructed according to the principles of the present invention.

Specifically, it comprises a print driver 100. Typically, this is implemented in software on a computer. However, in other examples, it is implemented in print device firmware or hardware.

Contone image data are received by the print driver 100. The image data are usually in the red, green, blue (RGB) color space. However, in other implementations, the image data may be already in the CMYK color space.

The print driver 100 has a color space converter 110, if required. The color space converter 110 generates target device contone image data from input contone image data, in which case the printer driver will use some method to convert the image data into CMYK (for example).

In one implementation, the color space converter 110 is similar to conventional converters. Specifically, it receives red, green, and blue contone image data. The converter 110 includes a look-up table that maps red, green, and blue levels to cyan, magenta, yellow, and black levels. As a result, the target device contone image data are produced in the color space, CMYK, of the target printing device.

Next, a total ink compensator 114 operates on the CMYK data 112 to generate compensated C'M'Y'K' 116 that conforms to the total ink restrictions of the printing device. On the CMYK data, the total ink reduction method is used to limit the total ink to some value. Preferably the method is setup to leave the black information unchanged, and only limit the ink by changing the CMY values. This new data is denoted as C'M'Y'K'.

The changed data C'M'Y'K' 116 is further processed using half toning techniques to convert it into dot on/dot off data for each colorant that is required by the print engine itself.

Specifically, the compensated color channels C'M'Y'K' 116 are received at a halftoning stage 118. This halftoning stage 118 converts the target device contone image data into target device halftone image data.

In some examples, the cyan channel, 112-C and the magenta channel, 112-M, are received by separate multi-level halftoners. These multi-level halftoners convert the target device contone image data for the corresponding color channel to multi-level halftone image data.

The halftone image data produced by the halftone stages 118, for each of C', M', Y', K' channels are directly processed by the print engine controller 122. Specifically, the print engine controller 122 converts the target device halftone image data 120 directly into commands to the print engine 124. In the present embodiment, the print engine 124 is an ink jet print head that sprays ink droplets onto media 10, such as paper. However, in other embodiments the print engine is a laser printer.

Figure 2:
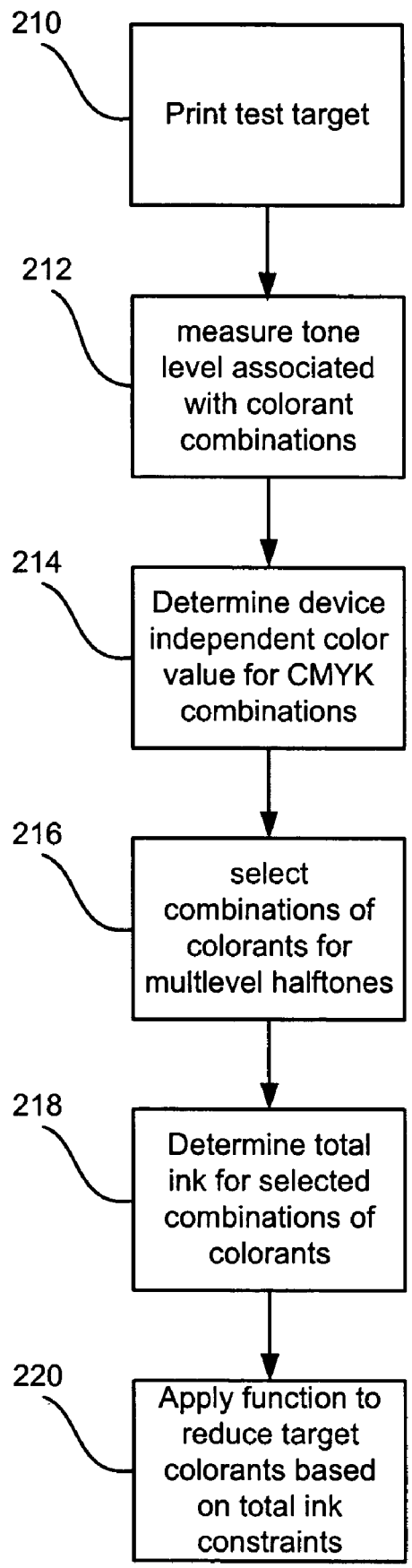
FIG. 2 is a flow diagram showing the process for applying total ink constraints according to the present invention.

Referring to FIG. 2, using the printer driver workflow as given above, the following sets forth the RGB to CMYK to C'M'Y'K' conversion method used by converter 110 and the total ink compensator 114 of the printer driver 100.

To setup the color space converter 110, a "color characterization" process is used. Color characterization aims to determine the color characteristics of a device and to define a separation method that converts any or specific color data, usually RGB, into matching colors on the device, usually CMYK.

First, using the printer driver, a test target is printed, including a sub-sampling of patches of the CMYK colorant space, in step 210.

Then, in step 212, the printed target is measured using a color measurement device. Specifically, spectral reflectance or color matching values associated with the various colorant combinations are measured. A measurement of each patch will, thus, provide a value for that patch in a well-defined device independent color space.

In step 214, using the measurements, a full description is deduced that gives a device independent color value for every possible CMYK combination. This is accomplished by derivation and by approximation or modeling techniques.

Based on the full description, a separation method is derived, in step 216 that relates device independent color values to corresponding device dependent CMYK value.

Then in step 218, the CMYK values are analyzed for compliance with the total-ink constraint. Specifically, the total ink applied for each of target colorants is summed for each of the determined device dependent CMYK values. In one implementation, the analysis is performed before the color is actually rendered by the printing process. Another possibility is to perform the step as part of the color management workflow where it used to restrict a color when converting to the device color space and the inverse is used to convert a device color of the printing process to another color space.

Finally, in step 220, the total-ink values for each of the CMYK values are reduced such that to comply with the total ink constraint by the total ink compensation stage 114.

In the present embodiment, a bijective function for total ink reduction on n colorants is used. A bijective function is a mathematical function that is both injective, i.e., one-to-one, and subjective, i.e., onto, such that the function creates a one-to-one correspondence between possible input values and possible output values.

The function is defined as follows:

Given the total ink function for n colorants $$\sigma(\vec{x}) = \sum_{i=1}^{n} x_i$$

Given the maximum ink function $$\mu(\vec{x}) = \max\{x_i; 1 \leq i \leq n\}$$

Given the total ink T and maximum ink per colorant M, then an example of a bijective total ink mapping function $\gamma$ is $$\gamma(\vec{x}) = \vec{x} \quad \text{iff } \sigma(\vec{x})M \leq T\mu(\vec{x})$$
$$= \vec{x}\left(\frac{\mu(\vec{x})T}{M\sigma(\vec{x})}\right) \quad \text{iff } \sigma(\vec{x})M > T\mu(\vec{x})$$

The advantage of our total-ink reduction method is that two different CMYK input values will always print as two different colors, although it may happen that they do become close when measured due to the printer physics.

This example of bijective function is not a smooth function however since the transition from the region where the function is acts to reduce ink and where it does not shows a non-continuous derivative. It is however possible, based on the given example, to define a more smooth bijective function.

To explain the motive to define a bijective function total-ink function, suppose now that the total-ink function would not be bijective, and so that two colors CMYK1 and CMYK2 exist that would print exactly in the same identical way. In that case measuring these two values would naturally give the identical same device independent color value, say XYZ. That is, measuring CMYK1 and CMYK2 both give XYZ as value. For the separation problem, which reversely has to choose a CMYK combination for the given XYZ value, this constitutes a dilemma since both CMYK1 and CMYK2 are equally valid candidates.

In addition to smoothness a second immediate extension of the example function is to limit its range of action to a subset of the available colorants. Suppose the target subset of colorants is the first m of the n-colorants. Then we can replace the bijective function above by first the defining a bijective function that does not change the last (n-m) colorants, and by replacing n by m and T by $T-\Sigma_{i=m+1}^{n}x_i$ in the definition of the total-ink function.

In another extension of the total-ink function we can assign weights to the different colorants. In this case an example of a bijective total-ink function could be:

Given n-weights w1, . . . , wn, which satisfy:

$$0 < w_i \leq 1 \hat{\ } \Sigma_{i=1}^{n} w_i = 1$$

Given the adjusted total ink function $$\sigma'(\vec{x}) = \Sigma_{i=1}^{n} w_i x_i$$

Given the adjusted maximum ink function $$\mu'(\vec{x}) = \max\{w_i x_i; 1 \leq i \leq n\}$$

Given the total ink T and maximum ink per colorant M, then an example of a bijective weighted total ink mapping function γ' is $$\gamma'(\vec{x}) = \vec{x} \qquad \text{iff } \sigma'(\vec{x})M' \leq T\mu'(\vec{x})$$
$$= \vec{x}\left(\frac{\mu'(\vec{x})T}{M'\sigma'(\vec{x})}\right) \quad \text{iff } \sigma'(\vec{x})M' > T\mu'(\vec{x})$$

where M' is given by $$M' = \max\{w_i M; 1 \leq i \leq n\}$$

In still other embodiments, the invention is used possibly outside of a printer workflow. This method can be thus applied inside, for example, a color correction software module.

In the case of color correction software there are two workflows that are described.

Figure 3:
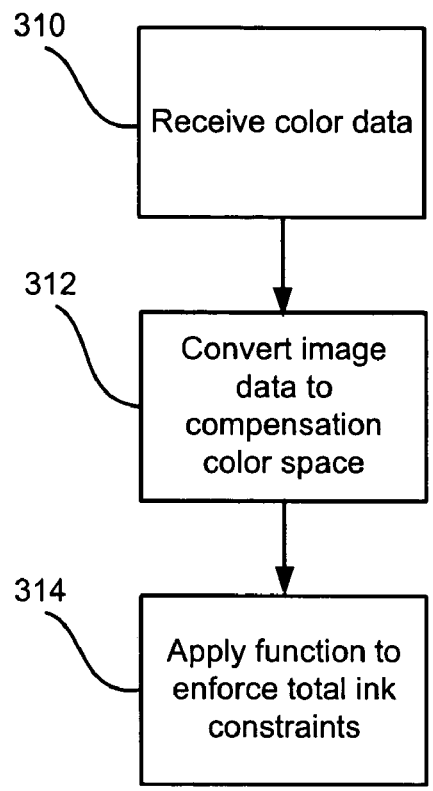
FIG. 3 is a flow diagram showing another process for applying total ink constraints according to the present invention.

In a first example, shown in FIG. 3, color correction software starts with or operates on color image data in step 310. That data can be in the form of a contone image or color patch values. Generally, this initial data is not in the color space in which we intend to apply the total ink method, such as for example the printer CMYK color space.

Next, in step 312, color correction software converts the color data from the initial color space to the color space in which compensation is to occur.

Then, the color correction software applies the total ink limitation method to restrict the total ink to a specific value in step 314. Specifically, the total ink compensation modifies the image data, in the compensation color space, to limit colorants applied to the media based on a total ink constraint while providing a one-to-one mapping between each possible input image data value and each possible compensated image data value to thereby produce compensated image data. This compensated image data is then typically passed to a print device in which the image is rendered.

Figure 4:
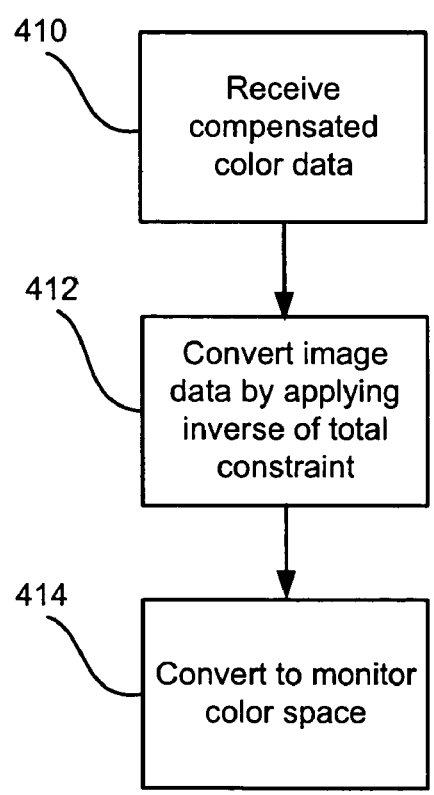
FIG. 4 is a flow diagram showing a process removing total ink constraints according to the present invention.

A second example, shown in FIG. 4, is used when the color correction software needs to convert color data already in the target color space and to a second color space. This situation arises, for example in soft-proofing, where it is the goal to show on the screen how the print will look. Thus, the second color space would typically be a computer monitor RGB color space.

Here, the compensated color data is received in step 410. These are data on which the total ink constraints have been previously applied. Further, the color space is typically the color space of the printer.

The color correction software then applies the inverse of the total ink method in step 412. This inverse exists because of the way the total ink method is defined. Specifically, since there is a one-to-one, loss-less, mapping between each possible input image data value and each possible compensated image data value, applying the inverse returns the original data without loss of information.

Lastly, the color correction software converts from the printer color space to the other color space, such as the monitor color space in step 414.

In this way, the inventive method is used to limit for example the total ink usage in the printing of the image already in the target color space. However, the effect of the total ink method is also undone, to enable monitoring of the rendition process on devices that do not require application of a total ink constraint.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for rendering an image on a target device from a contone image, the system comprising:
   a color space converter that generates target device contone image data from input contone image data;
   a print engine for applying colorants to media in response to compensated target device contone image data; and
   a total ink compensating stage for modifying the target device contone image data by limiting colorants applied to the media based on a total ink constraint while providing a one-to-one mapping between each possible input contone image data value and each possible compensated target device contone image data value to thereby produce compensated target device contone image data.

2. A system as claimed in claim 1, wherein the color space converter converts contone red, green, blue data to contone cyan, magenta, yellow, black data.

3. A system as claimed in claim 1, wherein the print engine is an ink jet printer.

4. A system as claimed in claim 1, wherein the print engine is a laser printer.

5. A system as claimed in claim 1, wherein the total ink compensating stage provides the one-to-one mapping between each possible input contone image data value and each possible compensated target device contone image data value using a bijective function.

6. A system as claimed in claim 1, wherein the total ink constraint limits only a subset of the colorants used by the print engine.

7. A system as claimed in claim 1, wherein the total ink compensating stage is embedded in an print driver.

8. A system as claimed in claim 1, further comprising a halftoning stage for converting the compensated target device contone image data into target device halftone image data.

9. A method for rendering an image at a target device from a contone image, the method comprising:
   receiving input contone image data;
   converting the input contone image data to target device contone image data;
   generating compensated target device contone image data in which colorants applied to the media are limited based on a total ink constraint while providing a one-to-one mapping between each possible input contone image data value and each possible compensated target device contone image data value;
   converting the compensated target device contone image data into target device halftone image data; and
   applying the colorants to media in response to the halftone image data.

10. A method as claimed in claim 9, wherein the step of converting the input contone image data to the target device contone image data comprises converting contone red, green, blue data to contone cyan, magenta, yellow, black data.

11. A method as claimed in claim 9, wherein the step of applying colorants to the media comprises applying ink with an ink jet printer.

12. A method as claimed in claim 9, wherein the step of applying colorants to the media comprises applying toner with a laser printer.

13. A method as claimed in claim 9, wherein the step of generating the compensated target device contone image data comprises mapping each possible input contone image data value to each possible compensated target device contone image data value using a bijective function.

14. A method as claimed in claim 9, wherein the step of generating the compensated target device contone image data comprises limiting only a subset of the colorants used by a print engine.

15. A method as claimed in claim 9, further comprising performing the step of generating the compensated target device contone image data in a print driver.

16. A method for converting image data for rendering an image, the method comprising:
   receiving input image data;
   converting the input image data to target device image data; and
   generating compensated target device image data in which colorants applied to the media are limited based on a total ink constraint while providing a one-to-one mapping between each possible input image data value and each possible compensated target device image data value.

17. A method as claimed in claim 16, wherein the step of converting is performed by color correction software.

18. A method as claimed in claim 16, wherein the input image data are converted to a CMYK color space of a printer.

19. A method as claimed in claim 16, further comprising:
   converting the compensated target device image data into target device halftone image data; and
   applying the colorants to media in response to the halftone image data.

20. A method as claimed in claim 16, further comprising:
   applying an inverse of the one-to-one mapping between each possible input image data value and each possible compensated target device image data value applied in the step of generating the compensated target device image data to generate decompensated target device image data; and
   converting the decompensated target device image data to a different color space.

21. A method as claimed in claim 20, wherein the step of applying the inverse is performed as part of a soft-proofing process.

22. A method as claimed in claim 16, wherein the step of generating the compensated target device image data comprises mapping each possible input image data value to each possible compensated target device image data value using a bijective function.

* * * * *